Jan. 19, 1926.

E. J. WILEY

PIPE TRAP

Filed August 28, 1923

1,570,112

Inventor

E. J. Wiley.

By Lacy & Lacy, Attorneys

Patented Jan. 19, 1926.

1,570,112

UNITED STATES PATENT OFFICE.

EDWARD J. WILEY, OF HOLLIDAYS COVE, WEST VIRGINIA.

PIPE TRAP.

Application filed August 28, 1923. Serial No. 659,752.

*To all whom it may concern:*

Be it known that I, EDWARD J. WILEY, a citizen of the United States, residing at Hollidays Cove, in the county of Hancock and State of West Virginia, have invented certain new and useful Improvements in Pipe Traps, of which the following is a specification.

This invention relates to an improved trap particularly designed for use in connection with oil pipe lines and seeks, among other objects, to provide a simple and efficient device of this character which will effectually serve to collect and retain any foreign particles or the like in the oil such as would clog the pipes or pump valves.

The invention seeks, as a further object, to provide a device which may be readily cleaned and wherein the straining member employed may be easily renewed.

And the invention seeks, as a still further object, to provide a device wherein the straining member will be formed as a separate unit independent of the fitting and plug of the device so that the straining member, even though being carried by the plug, may nevertheless be produced from a more durable material.

Other and incidental objects will appear hereinafter.

Figure 1:
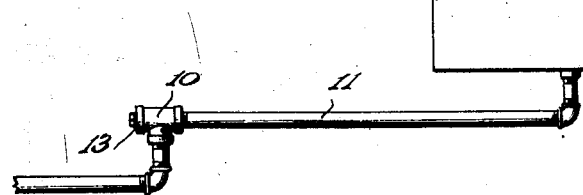
Figure 1 is a fragmentary elevation showing my improved trap in use.

In carrying the invention into effect, I employ a T-fitting 10 which may, as shown in Figure 1, be interposed in a pipe line 11 leading from a tank as conventionally illustrated at 12. The fitting 10 is threaded at the inlet and outlet thereof to receive the pipe and threaded into the end of said fitting opposite said inlet is a plug 13. The plug is provided at its outer side with a boss 14 to receive a wrench and formed in the plug at its inner side is an axially disposed socket 15.

Figure 2:
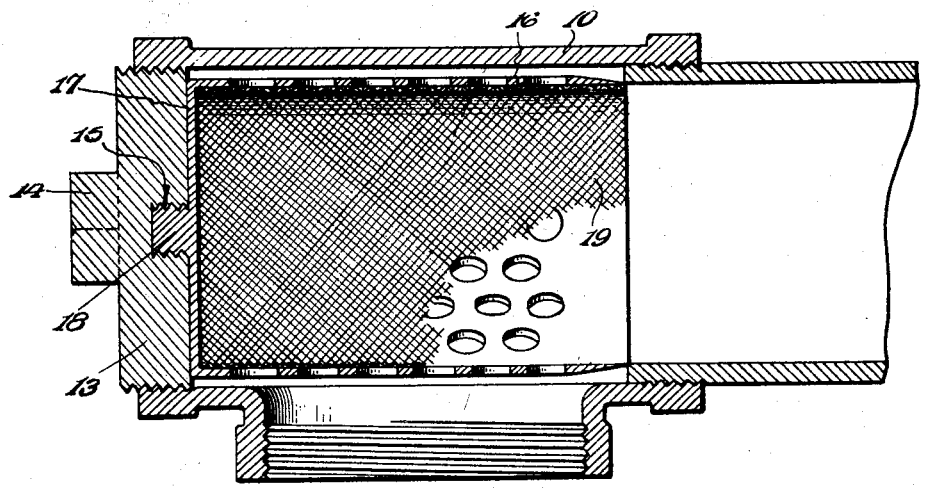
Figure 2 is an enlarged sectional view taken medially through the device.
Figure 3:
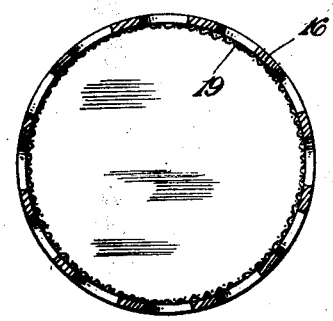
Figure 3 is a transverse sectional view of the straining member employed.

Mounted upon the plug 13 to extend across the outlet of the fitting 10 is a perforated cylindrical straining member 16 open at one end and closed at the other by an end wall 17. Formed on said wall axially of the member is a stud 18 threaded into the socket 15 of the plug mounting the member concentrically within the fitting. Thus, by removing the plug, the straining member may be readily displaced and cleaned while, since the member is detachably mounted upon the plug, said member may be readily renewed. Furthermore, this construction provides an arrangement whereby the straining member may be formed of brass while the fitting 10 and plug 13 may be cast. The expense of production is thus maintained at a minimum while the durability of the straining member is assured. As shown in Figure 2, the straining member is beveled at its forward end to mate with the adjacent end of a pipe engaged in the inlet of the fitting and is somewhat smaller than the fitting, being of an internal diameter substantially equal to the internal diameter of said pipe so that the oil will discharge from said pipe into the straining member. Accordingly, the oil will be strained through the member so that any foreign particles will be removed from the oil. However, to cover the contingency that the straining member might prove inadequate to thus strain the oil, I provide an auxiliary cylindrical screen 19. This screen is preferably formed of copper wire and is of cylindrical shape to snugly fit within the straining member overlying the holes therein. Thus, should it be found necessary, the screen may be employed to cooperate with the straining member for removing all undesired foreign substances from the oil. As will be observed, the openings at the ends of the fitting are of like diameter so that the plug may be engaged in either end of the fitting and the pipe 11 arranged to extend from the end of the fitting not occupied by the plug. Obviously, this feature will materially contribute to the convenience of the device in practical use.

Having thus described the invention, what is claimed as new is:

1. In a pipe trap, the combination of a fitting open at its ends and provided at one side thereof with an outlet, a plug closing one end of the fitting and reversible from said end of the fitting to the other end thereof, and a straining member carried by the plug to extend across said outlet and having an open unobstructed end, the straining member being of such dimensions that the unobstructed end abuts the adjacent end of a pipe engaged in the end of the fitting opposite the plug when the plug is inserted.

2. In a pipe trap, the combination of a fitting open at its ends and provided at one side thereof with an outlet, a plug closing one end of the fitting and reversible from said end of the fitting to the other end thereof, the plug being provided with a socket, and a straining member provided at one end with an end wall having a stud removably engaged in said socket and supporting the straining member to extend across said outlet, the opposite end of the straining member being open and unobstructed, and said member being of such dimensions that the unobstructed end abuts the adjacent end of a pipe engaged in the end of the fitting opposite said plug when the plug is inserted.

3. In a pipe trap, the combination of a fitting open at its ends and provided at one side thereof with an outlet, a plug closing one end of the fitting and reversible from said end of the fitting to the other end thereof, the plug being provided with an axial threaded socket, and a straining member provided at one end with an end wall having an axial threaded stud screwed into said socket and supporting the straining member to extend across said outlet, the opposite end of the straining member being beveled and said member being of such dimensions that the beveled end abuts the adjacent end of a pipe engaged in the end of the fitting opposite said plug when the plug is inserted.

In testimony whereof I affix my signature.

EDWARD J. WILEY. [L. S.]